United States Patent Office 2,890,269
Patented June 9, 1959

2,890,269

SECRECY COMMUNICATION SYSTEM

Walter S. Druz, Bensenville, Ill., assignor to Zenith Radio Corporation, a corporation of Delaware Application July 26, 1956, Serial No. 600,196

12 Claims. (Cl. 178—5.1)

This invention pertains to secrecy communication systems in which an intelligence signal is transmitted in coded form to be utilized only in a receiver equipped with a decoding device controlled in accordance with the coding schedule employed at the transmitter. More particularly, the invention relates to a novel apparatus for use in such a secrecy communication system to prevent transient distortion attributable to transmission band width limitations and to the coding or decoding operation. The novel arrangement of the present invention is particularly attractive when incorporated into the audio encoding portion of a subscription television system and for that reason is described in such an environment.

The invention may be practiced in either a transmitter or receiver and thus the term "encoding" is used herein in its generic sense to encompass either coding at the transmitter or decoding at the receiver.

Numerous secrecy systems have been proposed in which an intelligence signal, for example an audio signal, is coded by altering some characteristic of that signal, such as phase, usually at randomly spaced time intervals determined by a coding schedule which is made known only to authorized receivers. Most of these secrecy systems do effect adequate coding or scrambling of the intelligence signal. However, a distortion may result from such a coding process that may be charged, inter alia, to the limited band width allotted to audio transmission which prevents the translation of the entire range of frequency components representing the extremely sharp amplitude excursions of the coded audio signal produced by the phase inversions in the coding operation; almost an infinite band width would actually be required to duplicate such abrupt changes. Consequently, it is difficult in effecting compensating phase inversions in the decoding process at the receiver to avoid transient distortion pulses. Moreover, the compensating phase changes in the decoding apparatus at the receiver do not always occur in exact time coincidence with the corresponding phase changes at the transmitter. Additional undesirable transient pulses are consequently generated and reflected as transient distortion in the decoded audio signal.

Such transient distortion, of course, detracts from the fidelity or quality of reproduction of the decoded intelligence signal, and since the distortion occurs essentially at the instants of phase inversion in the decoding process, it may be effectively removed by interposing a sampling circuit and a low-pass filter in the audio channel in accordance with the teachings of copending application Serial No. 397,176, filed December 9, 1953, in the name of Howard K. Van Jepmond, and assigned to the present assignee. The operation of the sampler may be so phased with respect to the code schedule that the decoded signal is only sampled (by means of a super-audible, periodically recurring sampling signal) at times other than the instants of phase inversion. In this way, the decoded or unscrambled signal is sampled or examined only during those intervals when no distortion transients are present. The sampled signal is then shaped in a low-pass filter, producing a distortion-free simulation of the original uncoded signal.

Even though the sampling arrangement of the copending Van Jepmond application does eliminate the distortion attributable to the band width limitations, it is nevertheless essential to provide audio translating stages in the receiver that reproduce a relatively wide range of frequencies in order that the phase inversions of the received coded audio signal are as sharp or as steep as possible. Otherwise, if the phase inversions are "stretched out" or prolonged for a time duration greater than the time separation of the sampling instants, the distortion will obviously not be removed.

Thus, it is necessary to employ relatively wide band receiver audio stages in the Van Jepmond arrangement which respond to frequencies not only in the audible range but substantially beyond that range. As an incident to such wide band reception, it is possible that unwanted super-audible or supersonic high frequency noise components may also be accepted, particularly in a weak signal area. Moreover, when the sound translating stages are incorporated in a television receiver of the intercarrier type, low frequency video or picture signal components that may be present in the intercarrier sound signal will likewise be translated through the wide band audio stages. These noise and video components (both of which may be called extraneous noise components here inasmuch as they are not part of the audio signal), being outside of the audible range, would not ordinarily introduce any audible distortion, but since the sampling function in the receiver is actually a modulation function, the undesired extraneous noise components are beat or heterodyned down by the sampling signal into the audible range. Consequently, the objectionable noise components may be heard in the decoded audio signal.

The present invention stems from the previous work of Van Jepmond and provides a secrecy communication system which produces an encoded intelligence signal that is not only free of transient distortion but is also substantially devoid of the above described undesired noise signal components.

It is, accordingly, an object of the present invention to provide an improved secrecy communication system of the type disclosed in the Van Jepmond application.

It is another object of the invention to provide a secrecy communication transmitter or receiver wherein the coded or decoded intelligence signal is substantially free of transient distortion and extraneous noise components.

It is still another object of the invention to provide an audio encoding arrangement for a subscription television system for producing a distortion-free and noise-free audio signal.

A secrecy communication system, constructed in accordance with the present invention, comprises a source of intelligence signal and encoding apparatus coupled to the source. The encoding apparatus includes a control mechanism for developing an encoding signal having characteristic variations representing a predetermined code schedule and an encoding device for utilizing the encoding signal to vary a characteristic of the intelligence signal between a plurality of different modes in accordance with the code schedule to develop an encoded intelligence signal with the transitions during the mode-changing intervals subject to introducing undesired distortion in the encoded intelligence signal.

Means is coupled to the encoding apparatus and responds to the encoding signal for developing a gating signal. Finally, the secrecy communication system comprises gating means coupled to the gating-signal-developing means and to the encoding apparatus for utilizing the gating signal to effectively delete those portions of the encoded intelligence signal occurring during the mode-changing intervals, thereby removing the undesired distortion.

The features of this invention which are believed to be new are set forth with particularity in the appended claims. The invention, together with further objects and advantages thereof, may best be understood, however, by reference to the following description in conjunction with the accompanying drawings, in which:

Figure 1 is a schematic representation of a secrecy communication system, specifically a subscription television receiver, constructed in accordance with one embodiment of the invention;

Figure 2 comprises a family of curves which appear at various points in the receiver of Figure 1;

Figure 3 represents a portion of the receiver illustrated in Figure 1 constituting another embodiment of the invention; and, Figure 4 illustrates various wave forms which are helpful in explaining the operation of the embodiment of Figure 3.

While the present invention is applicable to any type of secrecy communication and, moreover, to any type of coding, it is illustrated in connection with a subscription television receiver for convenience. Furthermore, it should be understood that the arrangement of the present invention may be applied to the transmitter as well as the receiver portion of a secrecy system since it is often desirable to eliminate any telltale transient pulses that may be introduced into the audio signal by the coding process each time a mode change is made, and which may be subsequently derived from the audio signal and utilized in unauthorized decoding.

The receiver illustrated in Figure 1 is constructed to utilize a telecast originating at a transmitter which is made in accordance with copending application Serial No. 366,727, filed July 8, 1953, and issued September 16, 1958, as Patent No. 2,852,598, in the name of Erwin M. Roschke, and assigned to the present assignee. Briefly, in that application a counting device responds to line-synchronizing pulses to develop a square wave coding signal having amplitude changes occurring during the line-retrace interval following each succession of 15 line-trace intervals. During the field-retrace intervals, coding pulses are developed and supplied to various input circuits of a bi-stable multivibrator to effect actuation thereof, preferably in random fashion. The counting device is re-phased during each field-retrace interval under the control of the bi-stable multivibrator and thus the square wave coding signal from the counter is phase modulated in a random manner. The phase modulator coding signal is employed to effect mode changes in the transmitter by alternately introducing and then removing a time delay of the video with respect to the synchronizing components. The code signal pulses may be transmitted along with the video signal during the field-retrace intervals to facilitate the proper phasing of a similar square wave signal at the receiver.

The coding signal is also used in the Roschke system to encode the audio intelligence. This is accomplished by applying it to the deflection electrodes of a beam-deflection device having a control grid, which is modulated in accordance with the uncoded audio intelligence, and further having a pair of collector anodes connected to opposite terminals of the primary winding of an output transformer. With this arrangement, the phase of the audio signal is effectively inverted at the secondary winding of the transformer each time the beam switches from one anode to the other, and this occurs each time there is an amplitude variation of the square wave coding signal.

The audio phase inversion process of the Roschke system is subject to the introduction of transient distortion since the mode changes may not occur in exact synchronism at the transmitter and receiver, and the limited band width transmission precludes the reproduction of extremely sharp phase inversions. Consequently, the receiver of Figure 1 is similar to that shown in Roschke but is further adapted to prevent the introduction of any noise or transient components in the decoded audio signal.

More specifically, the receiver comprises a radio-frequency amplifier 10 having input terminals connected to an antenna circuit 11 and output terminals connected to a first detector 12. This detector is coupled through an intermediate-frequency amplifier 13 to a second detector 14 which, in turn, is connected to the input circuit of a video amplifier 15. The output circuit of the video amplifier is connected through a video decoder 16 to the input electrodes of a cathode-ray image-reproducing device 19.

Decoder 16 may be similar to that disclosed and claimed in copending application Serial No. 243,039, filed August 22, 1951, and issued August 7, 1956, as Patent 2,758,153, in the name of Robert Adler, and assigned to the present assignee. It may comprise a beam-deflection tube having a pair of output circuits which may be selectively coupled into the video channel as the electron beam of the tube is deflected from one to the other of two collector anodes in synchronism with mode changes of the transmitted signal. As mentioned hereinbefore, these mode changes take the form of variations in the timing of the video components relative to the synchronizing components of the received composite television signal. Consequently, the output circuit coupled to one anode segment includes a time delay network while the output connected to the other anode segment does not, and the timing variations are compensated, effectively to decode the television signal, as the beam of the deflection tube is switched between its anodes. This switching effect is accomplished by means of a deflection-control or actuating signal applied to video decoder 16, as explained hereinafter.

Second detector 14 is also coupled to a synchronizing-signal separator 22 which is coupled, in turn, to a field-sweep system 23 and to a line-sweep system 24. The output terminals of sweep systems 23 and 24 are connected respectively to field- and line-deflection elements (not shown) associated with image reproducer 19.

Video amplifier 15 is also connected to an amplifier and amplitude limiter 26 which, in turn, is coupled to a discriminator detector 27. The output terminals of detector 27 are connected through a delay line 28 to one pair of input terminals of an encoding device in the form of an audio decoder 30. This decoder, as explained briefly hereinbefore and in detail in the aforementioned Roschke application, may comprise a beam-deflection device which is actuated in accordance with the coding schedule of the telecast to effect compensating phase inversions of the coded audio signal to effectively decode that signal.

Alternatively, audio decoder 30 may comprise a phase splitter and an electronic selector switch as shown in copending application Serial No. 513,757, filed June 7, 1955, in the name of Walter S. Druz, and assigned to the present assignee. In that application, the phase splitter supplies the coded audio signal to the electronic selector switch in push-pull relationship, namely, with two different phases 180° apart. The switch is actuated in accordance with the coding schedule to select certain portions of each of the two signals from the phase splitter.

The decoded audio signal developed in decoder 30 contains transient distortion during the mode-changing intervals and this is removed, in accordance with the invention, by connecting the output of decoder 30 to a normally-open gate circuit 32 through a resistor 33. Gate 32 is of a bridge type and includes a unidirectional device, such as a diode 34, in each of its four arms or legs.

One corner A of the bridge is connected to resistor 33 and the diagonally opposite corner C is connected to one side of a charging or storage condenser 35, the other side of which is connected to ground. The other two diagonally opposite corners, B and D, are connected together through a series arrangement of a resistor 37, the secondary winding 38 of a transformer 40 and a source of unidirectional potential such as a battery 41. The ungrounded terminal of condenser 35 is connected through an audio amplifier 44 to the input terminals of a speaker 45.

Gate circuit 32 is so arranged that source 41 renders all of the diodes 34 normally conductive, and therefore an A.C. signal applied between corner A and ground will be translated through the bridge to corner C and thus impressed across condenser 35. The manner in which the gate is shut off or closed during certain time intervals will be discussed hereinafter.

In order to produce a deflection-control signal for video decoder 16 and audio decoder 30, a control mechanism or decoding signal source 48 is connected directly to video decoder 16 and to audio decoder 30 through a delay line 49. Decoding signal source 48 provides a square wave encoding (decoding) signal, exhibiting amplitude variations during line-retrace intervals representing the code schedule of the telecast, to decoders 16 and 30 which is identical to that supplied to the corresponding circuits at the transmitter of the aforementioned Roschke application, Serial No. 366,727. Of course, the manner in which the coding signal at the transmitter and the corresponding decoding signal at the receiver are developed is entirely immaterial to the present invention; for that reason, source 48 has been shown merely as one block in the drawing for the sake of simplicity. For example, in accordance with the Roschke application, the square wave decoding signal developed in control mechanism 48 may be synchronized and phased with relation to the counterpart coding square wave at the transmitter by means of signal bursts transmitted along with the television signal during vertical-retrace intervals. The phase modulated square wave from source 48 effects operation of audio decoder 30 during line-retrace intervals in order to realize compensating phase inversions of the coded audio during such intervals.

In order to develop a gating signal for controlling the condition of gate 32, in accordance with the present invention, two differentiators and rectifiers 51, 52 are connected to the output of decoding signal source 48. Unit 51 is connected through a phase inverter 54 to one pair of input terminals of an adder 53, and differentiator and rectifier 52 is connected directly to another pair of input terminals of the adder. The output of adder 53 is connected to the input circuit of a mono-stable multivibrator 55 which is connected in turn to the primary winding 56 of transformer 40 in normally-open gate 32. With this arrangement, gating pulses are applied to primary winding 56 with proper magnitude and polarity to render diodes 34 non-conductive during the occurrence of such pulses. Consequently, gate 32 is closed at those instants.

In the operation of the described receiver of Figure 1, the coded television signal is intercepted by antenna 11, amplified in radio-frequency amplifier 10 and heterodyned to the selected intermediate frequency of the receiver in first detector 12. The resulting intermediate-frequency signal is amplified in intermediate-frequency amplifier 13 and detected in second detector 14 to produce a composite video signal. This latter signal is amplified in video amplifier 15, translated through video decoder 16 and impressed on the input electrodes of image reproducer 19 to control the intensity of the cathode-ray beam of the reproducing device in well known manner. Video decoder 16 receives a decoding signal from decoding signal source 48 which has amplitude variations occurring in exact time coincidence with amplitude variations of the coding signal applied as a deflection-control signal to a corresponding video coder in the transmitter of the aforementioned Roschke application, Serial No. 366,727, so that the video components applied to the input electrodes of image reproducer 19 are suitably compensated or decoded to effect intelligible image reproduction.

The synchronizing components of the received signal are separated in separator 22, the field-synchronizing components being utilized to synchronize sweep system 23 and, therefore, the field scansion of the image reproducer, while the line-synchronizing pulses are utilized to synchronize sweep system 24 and, therefore, the line scansion of device 19.

Consideration will now be given to the particular manner in which transient distortion that may otherwise result from the transmission band width limitations and the audio decoding process is eliminated in accordance with the invention, with reference to the idealized signal wave forms of Figure 2 which appear at certain points within the audio section of the receiver, which points are indicated by encircled reference letters corresponding to the designations of the curves in Figure 2. An intercarrier sound signal derived from video amplifier 15 is amplified and amplitude limited in unit 26 and detected in discriminator detector 27 to develop the coded audio signal of curve E.

The signal is illustrated for convenience as a sinusoidal signal wave having a frequency of approximately 800 cycles per second and characterized by various phase inversions 60 occurring in a pattern established by the audio coder at the transmitter. Since mode changes are made in the transmitter of the Roschke application after every 15 line-trace intervals, phase inversions 60, which take place at the mode changes, occur at a frequency of approximately 1,000 cycles per second under the present United States standards. With the exception of the third phase inversion 60 from the left in curve E, which just happens to occur at a zero cross-over point of the sinusoidal signal, the phase inversions do not occur instantaneously with an infinite slope but require a finite time interval as shown by the slanting rather than vertical configuration of the wave forms at those mode-changing intervals. As mentioned hereinbefore, even if the phase inversions occur instantaneously at the transmitter, it would require the transmission of an infinitely wide band width to transmit all the frequency components which represent such instantaneously abrupt phase inversions.

The coded audio signal of curve E is delayed in delay line 28 to form the signal of curve E′ for application to audio decoder 30. The characteristics of delay line 28 are adjusted so that it introduces a time delay greater than the time duration of a phase inversion 60, for reasons which will become apparent later.

In order to effect compensating phase inversions and accomplish decoding of the coded audio signal of curve E′, decoding signal source or control mechanism 48 develops the encoding signal of curve F having amplitude variations occurring in time coincidence with the mode changes introduced at the transmitter and, consequently, in synchronism with the phase reversals of the received coded audio signal of curve E. Curve F is translated through delay line 49 to develop the signal of curve F′ for application to decoder 30. Delay line 49 introduces exactly the same delay to the signal of curve F as that introduced to waveform E by delay line 28 in order to compensate for the delay of network 28.

Encoding signal F′ effects a phase reversal of the coded audio signal of curve E′ in decoder 30 in response to each amplitude variation of curve F′ to produce at the output terminals of the decoder a decoded audio signal having the wave shape shown in curve G. From an examination of the signal of curve G it will be seen that there is a "spike" or "pie cut" in the sinusoidal signal at each mode-changing interval, with the exception of the third one from the left, due to the prolonged rather than instantaneous phase changes in the coded audio signal of curve E. Additionally, undesirable switching transients, shown as pulses 61 in curve G, may be introduced during the decoding process. For example, if decoder 30 takes the form of a beam-deflection tube, such distortion my result from the transfer characteristic of the tube and may also be attributed to the load circuit of the tube, especially if it includes an output transformer. For convenience, transient pulses 61 are drawn on a reduced scale in the illustrated diagram; it will be appreciated that these pulses are usually many times greater in amplitude than the audio intelligence signal.

It is apparent that the distortion of the sinusoidal signal of curve G, if not eliminated, would detract from the listening quality rather considerably. In accordance with the present invention, the distortion is deleted by applying the square wave decoding signal of curve F to differentiator and rectifier units 51 and 52. These differentiators and rectifiers differentiate both the positive and negative amplitude excursions of the signal of curve F but unit 51 only passes the negative differentiated pulses to form the signal of curve H and unit 52 only passes the positive differentiated pulses to form the signal of curve J. The pulses of curve H are inverted in phase inverter 54 to form the positive pulses of curve K, and the signals of both curves J and K are added in adder 53 to form the signal of curve L. Thus, a rather sharply defined pulse is produced for each mode change of the coded audio of curve E. The pulses of curve L are then applied to mono-stable multivibrator 55 to produce the elongated pulses of curve M. The parameters of the multivibrator are so adjusted that once it is triggered from its normal to its abnormal condition, it will remain there for a time interval slightly exceeding the duration of each phase inversion of curve E, at which time it will return to its reference condition. With this arrangement, the pulses of curve M, each of which corresponds to an assigned mode-changing interval, may be employed as gating pulses to close gate 32 and therefore to delete or remove the distortion occurring during the mode-changing intervals in curve G.

Turning now to the operation of normally-open gate circuit 32, during the time intervals when a pulse of curve M is not applied to the gate the decoded audio signal of curve G is translated directly through the gate to the input of audio amplifier 44 without alteration. The potential on storage condenser 35 follows the applied decoded audio signal of curve G, charging through gate 32 when the decoded audio increases in amplitude and discharging also through the gate when the decoded audio signal decreases in amplitude. However, during the intervals of the gating pulses of curve M, negative pulses are developed in secondary winding 38 of transformer 40 to render each of the diodes 34 non-conductive. The circuit from audio decoder 30 to storage condenser 35 is effectively interrupted during the pulses of curve M and thus the condenser, being isolated, cannot follow the instantaneous amplitude changes of the decoded audio. Since the charging and discharging circuit for condenser 35 is open during those intervals, the condenser will hold the charge which it assumed immediately prior to each mode changing interval throughout the duration of the pulses of curve M. Upon the termination of each gating pulse gate 32 returns to its normally-open condition, completing the charging and discharging circuit for condenser 35, and the decoded audio signal is once again impressed across the condenser, which thereupon changes its charge level to assume the new instantaneous potential of the applied signal, as shown by the signal of curve N which is the signal applied to amplifier 44. From a close study of the wave form of curve N it may be observed that the decoded audio signal remains at its instantaneous value immediately preceding each gating pulse of curve M for the duration of each gating pulse, at which time it changes in exponential fashion to the value of the applied decoded audio.

The signal of curve N is then amplified in amplifier 44 and is applied to speaker 45. Even though the wave form of curve N does contain some discontinuities from a true sinusoidal shape, it is quite acceptible and constitutes a considerable improvement over the signal of curve G. Actually, the discontinuities of the signal of curve N are "smoothed out" somewhat due to the fact that amplifier 44 and speaker 45 have a limited response range and those discontinuities are represented by high frequency components.

Inasmuch as the audio section of the subscription television receiver of Figure 1 responds to a frequency modulated signal, condenser 35 and resistor 33 may also serve as the required de-emphasis network.

The reason for including delay line 28 in the audio channel should now be apparent. By delaying the audio signal, the amplitude excursions of the undelayed decoding signal of curve F may be utilized to develop the actuating pulses of curve M, each of which pulses individually embraces the distortion components during an assigned one of the mode-changing intervals in the decoded audio of curve G. In this way, it is possible to anticipate each mode change and then delete or remove the portions of the decoded audio during the mode-changing intervals.

It should also be now apparent that undesirable noise components are not beat down into the audible range, as may occur with the Van Jepmond arrangement, since a sampling signal exhibiting a super-audible frequency is not employed.

By way of summary, amplifier and limiter 26 and detector 27 constitute a source of intelligence signal, namely, a source of a coded audio curve, curve E. Encoding apparatus is coupled to this source through delay line 28 and includes a control mechanism, such as decoding signal source 48, for developing an encoding signal (curve F) having characteristic (amplitude) variations representing a predetermined code schedule and an encoding device (audio decoder 30) for utilizing the encoding signal to vary a characteristic (phase) of the intelligence signal between a plurality of different modes in accordance with the code schedule. An encoded intelligence signal (curve G) is therefore developed with the transitions during the mode-changing intervals subject to introducing undesired distortion. Differentiator and rectifier units 51 and 52, phase inverter 54, adder 53 and mulivibrator 55 constitute means coupled to the encoding apparatus, namely, to control mechanism 48, and responsive to the encoding signal (curve F) for developing a gating signal (curve M). This gating signal consists of a series of pulses each of which corresponds to an assigned mode-changing interval. Finally, the secrecy communication system includes gating means in the form of normally-open gate circuit 32 which is coupled to the gating-signal-developing means (namely, to the output of multivibrator 55) and to the encoding apparatus (to audio decoder 30) for utilizing the gating signal to effectively delete those portions of the encoded intelligence signal occurring during the mode changing intervals (to produce the signal of curve N), thereby removing the undesired distortion.

In discussing the operation of gate circuit 32, it was pointed out that condenser 35 maintained a constant potential during each gating pulse of curve M and at the termination of each pulse the charge varied in exponential manner to assume the instantaneous potential of the applied decoded audio signal. A small portion of the wave form of curve N, including the first complete sinusoidal cycle, has been redrawn in Figure 4 on an expanded time scale and with increased amplitude to illustrate the manner in which the charge on condenser 35 changes exponentially rather than instantaneously upon the termination of the first gating pulse of curve M. The dashed line in the portion of curve N shown in Figure 4 illustrates the desired wave form of the signal during the mode-changing interval and immediately following. The area between the dashed line and the actual wave shape represents the distortion of the signal as applied to audio amplifier 44. As mentioned hereinbefore, that wave shape is "smoothed out" because of the response characteristics of amplifier 44 and speaker 45 so the slight distortion in the signal is not objectionable.

However, to improve the arrangement of Figure 1 and therefore to decrease further the amount of distortion remaining in the decoded audio signal before application to audio amplifier 44, it is desirable to decrease the area between the solid and dashed lines in curve N of Figure 4. In the embodiment of Figure 3, such distortion is reduced by connecting decoder 30 directly to normally-open gate circuit 32, thereby eliminating the resistance of resistor 33, and by decreasing the capacitance of condenser 35. In this way, condenser 35 charges and discharges instantaneously as shown by the signal of wave form P, which is developed in the output of gate 32 in Figure 3 in response to the first complete sine wave cycle of curve G. Upon the termination of the gating pulse, condenser 35 immediately acquires the potential of the applied audio. The area between the dashed and solid line curves of wave form P is consequently considerably less than that of wave form N, resulting in less distortion in the signal. The signal of curve P is then applied to a separate de-emphasis circuit 63 through a buffer 64 wherein the high frequency components are effectively removed due to the characteristics of the de-emphasis network to produce the signal of curve Q for application to amplifier 44. It will be apparent from a comparison of the wave shapes of curves N and Q that the signal applied to amplifier 44 in Figure 3 has considerably less distortion than that applied to amplifier 44 in Figure 1. Amplifier 44 in Figure 3 further "smoothes out" the wave shape of curve Q so that the signal to which speaker 45 responds is substantially a true simulation of the original sinusoidal signal originating at the transmitter.

The invention provides, therefore, an improved secrecy communication system for producing an encoded intelligence signal that is relatively free of transient distortion which may arise due to transmission band width limitations and/or may be introduced during the coding or decoding process. This is very effectively achieved by anticipating each mode change and then deleting those portions of the encoded intelligence signal during the mode-changing intervals.

While particular embodiments of the invention have been shown and described, modifications may be made, and it is intended in the appended claims to cover all such modifications as may fall within the true spirit and scope of the invention.

I claim:

1. A secrecy communication system comprising: a source of intelligence signal; encoding apparatus coupled to said source including a control mechanism for developing an encoding signal having characteristic variations representing a predetermined code schedule and an encoding device for utilizing said encoding signal to vary a characteristic of said intelligence signal between a plurality of different modes in accordance with said code schedule to develop an encoded intelligence signal with the transitions during the mode-changing intervals subject to introducing undesired distortion in the encoded intelligence signal; means coupled to said encoding apparatus and responsive to said encoding signal for developing a gating signal; and gating means coupled to said gating-signal-developing means and to said encoding apparatus for utilizing said gating signal to effectively delete those portions of said encoded intelligence signal occurring during the mode-changing intervals, thereby removing said undesired distortion.

2. A secrecy communication system comprising: a source of intelligence signal; encoding apparatus coupled to said source for varying a characteristic of said intelligence signal between a plurality of different modes in accordance with a predetermined code schedule to develop an encoded intelligence signal with the transitions during the mode-changing intervals subject to introducing undesired distortion in the encoded intelligence signal; means coupled to said encoding apparatus for developing a gating signal consisting of a series of pulses each of which corresponds to an assigned mode-changing interval; and gating means coupled to said gating-signal-developing means and to said encoding apparatus for utilizing said gating signal to effectively delete only those portions of said encoded intelligence signal occurring during the mode-changing intervals, thereby removing said undesired distortion.

3. A secrecy communication system comprising: an audio signal source; encoding apparatus coupled to said source including a control mechanism for developing an encoding signal having characteristic variations representing a predetermined code schedule and a phase-inverting encoding device for utilizing said encoding signal to invert the phase of said audio signal at selected times determined by said code schedule to develop an encoded audio signal with the transitions at said selected times subject to introducing undesired distortion in the encoded audio signal; means coupled to said encoding apparatus and responsive to said encoding signal for developing a gating signal; and gating means coupled to said gating-signal-developing means and to said encoding apparatus for utilizing said gating signal to effectively delete those portions of said encoded audio signal occurring at said selected times, thereby removing said undesired distortion.

4. A secrecy communication system comprising: an audio signal source; encoding apparatus coupled to said source including a control mechanism for developing an encoding signal having amplitude variations representing a predetermined code schedule and a phase-inverting encoding device for utilizing said encoding signal to vary the phase of said audio signal between a plurality of different modes in accordance with said code schedule to develop an encoded audio signal with the transitions during the mode-changing intervals subject to introducing undesired distortion in the encoded audio signal; a utilizing circuit; a gate circuit coupling said encoding apparatus to said utilizing circuit and normally conditioned to translate said encoded audio signal to said utilizing circuit; means coupled to said control mechanism and responsive to said encoding signal for developing a gating signal consisting of a series of pulses each of which corresponds to an assigned mode-changing interval; and means coupling said gating-signal-developing means to said gate circuit to render said gate circuit ineffective during each mode-changing interval, effectively to delete those portions of said encoded audio signal occurring during the mode-changing intervals to thereby remove said undesired distortion.

5. An audio decoding arrangement for a subscription television receiver comprising: a source of coded audio signal having a number of phase inversions occurring in accordance with a predetermined code schedule; a decoding apparatus coupled to said audio signal source for reinverting the phase of said coded audio signal at selected times determined by said predetermined code schedule to develop a decoded audio signal with the transitions during the selected times subject to introducing undesired distortion in the decoded audio signal; means coupled to said decoding apparatus for developing a gating signal consisting of a series of pulses each of which corresponds to an assigned one of said selected times; and gating means coupled to said gating-signal-developing means and to said decoding apparatus for utilizing said gating signal to effectively delete only those portions of said decoded audio signal occurring during the selected times, thereby removing said undesired distortion.

6. A subscription television system comprising: a source of video signal; video encoding apparatus coupled to said video signal source for varying the mode of translation of said video signal at mode-changing intervals established in accordance with a predetermined code schedule; a source of audio signal; audio encoding apparatus coupled to said audio signal source for varying a characteristic of said audio signal between a plurality of different modes in accordance with said same predetermined code schedule to develop an encoded audio signal with the transitions during the mode-changing intervals subject to introducing undesired distortion in the encoded audio signal; means coupled to said audio encoding apparatus for developing a gating signal consisting of a series of pulses each of which corresponds to an assigned mode-changing interval; and gating means coupled to said gating-signal-developing means and to said audio encoding apparatus for utilizing said gating signal to effectively delete only those portions of said encoded audio signal occurring during the mode-changing intervals, thereby removing said undesired distortion.

7. A secrecy communication system comprising: a source of intelligence signal; encoding apparatus coupled to said source including a control mechanism for developing an encoding signal having characteristic variations representing a predetermined code schedule and an encoding device for utilizing said encoding signal to vary a characteristic of said intelligence signal between a plurality of different modes in accordance with said code schedule to develop an encoded intelligence signal with the transitions during the mode-changing intervals subject to introducing undesired distortion in the encoded intelligence signal; a gate circuit coupled to said encoding apparatus and including a normally-open charging-discharging circuit and a storage condenser to which is translated said encoded intelligence signal through said charging-discharging circuit; a utilizing circuit coupled across said storage condenser; means coupled to said control mechanism and responsive to said encoding signal for developing a gating signal consisting of a series of pulses each of which corresponds to an assigned mode-changing interval; and means coupling said gating-signal-developing means to said gate circuit to close said charging-discharging circuit during each mode-changing interval in order to maintain said storage condenser at the charge to which it assumed immediately preceding the mode-changing interval, effectively to delete those portions of said encoded intelligence signal occurring during the mode-changing intervals and to thereby remove said undesired distortion.

8. A frequency-modulation secrecy communication system comprising: a source of audio signal; encoding apparatus coupled to said source including a control mechanism for developing an encoding signal having characteristic variations representing a predetermined code schedule and an encoding device for utilizing said encoding signal to vary a characteristic of said audio signal between a plurality of different modes in accordance with said code schedule to develop an encoded audio signal with the transitions during the mode-changing intervals subject to introducing undesired distortion in the encoded audio signal; a gate circuit coupled to said encoding apparatus and including a normally-open charging-discharging circuit and a storage condenser to which is translated said encoded audio signal through said charging-discharging circuit, said condenser and charging-discharging circuit forming a de-emphasis network; a utilizing circuit coupled across said storage condenser; means coupled to said control mechanism and responsive to said encoding signal for developing a gating signal consisting of a series of pulses each of which corresponds to an assigned mode changing interval; and means coupling said gating-signal-developing means to said gating circuit to close said charging-discharging circuit during each mode-changing interval in order to maintain said storage condenser at the charge to which it assumed immediately preceding the mode-changing interval, effectively to delete those portions of said encoded audio signal occurring during the mode-changing intervals and to thereby remove said undesired distortion.

9. A secrecy communication system comprising: a source of intelligence signal; encoding apparatus coupled to said source including a control mechanism for developing an encoding signal having characteristic variations representing a predetermined code schedule and an encoding device for utilizing said encoding signal to vary a characteristic of said intelligence signal between a plurality of different modes in accordance with said code schedule to develop an encoded intelligence signal with the transitions during the mode-changing intervals subject to introducing undesired distortion in the encoded intelligence signal; means coupled to said encoding apparatus and responsive to said encoding signal for developing a gating signal; gating means coupled to said gating-signal-developing means and to said encoding apparatus for utilizing said gating signal to effectively delete those portions of said encoded intelligence signal occurring during the mode-changing intervals, thereby removing said undesired distortion but introducing a discontinuity in said encoded intelligence signal during each mode-changing interval represented by relatively high frequency components; and frequency-selective means coupled to said gating means for removing substantially all of said high frequency components effectively to smooth out the discontinuities in said encoded intelligence signal.

10. A frequency-modulation secrecy communication system comprising: a source of audio signal; encoding apparatus coupled to said source including a control mechanism for developing an encoding signal having characteristic variations representing a predetermined code schedule and an encoding device for utilizing said encoding signal to vary a characteristic of said audio signal between a plurality of different modes in accordance with said code schedule to develop an encoded audio signal with the transitions during the mode-changing intervals subject to introducing undesired distortion in the encoded audio signal; means coupled to said encoding apparatus and responsive to said encoding signal for developing a gating signal; gating means coupled to said gating-signal-developing means and to said encoded apparatus for utilizing said gating signal to effectively delete those portions of said encoded audio signal occurring during the mode-changing intervals, thereby removing said undesired distortion but introducing a discontinuity in said encoded audio signal during each mode-changing interval represented by relatively high frequency components; and frequency selective means including a de-emphasis network coupled to said gating means for removing substantially all of said high frequency components effectively to smooth out the discontinuities in said encoded intelligence signal.

11. A secrecy communication receiver comprising: a source of coded intelligence signal having a characteristic varying between a plurality of different modes during mode-changing intervals in accordance with a predetermined code schedule; a control mechanism for developing a decoding signal having characteristic variations representing said code schedule and occurring during said mode-changing intervals; delay means; a decoding device coupled to said source and said control mechanism through said delay means to develop a decoded intelligence signal with the transitions during the mode-changing intervals subject to introducing undesired distortion in the decoded intelligence signal; means coupled to said control mechanism and responsive to said decoding signal for developing a gating signal which effectively anticipates each mode change of said decoded intelligence signal; and gating means coupled to said gating-signal-developing means and to said decoding device for utilizing said gating signal to effectively delete those portions of said decoded intelligence signal occurring during the mode-changing intervals, thereby removing said undesired distortion.

12. A secrecy communication receiver comprising: a source of coded audio signal having a number of phase inversions occurring during mode-changing intervals in accordance with a predetermined code schedule; a control mechanism for developing a decoding signal having amplitude variations representing said code schedule and occurring during said mode-changing intervals; a first delay device for introducing a predetermined time delay to an applied signal; a second delay device for introducing said same predetermined time delay to an applied signal; a decoding device coupled to said source through said first delay device and to said control mechanism through said second delay device for reinverting the phase of said coded audio signal during said mode-changing intervals to develop a decoded audio signal with the transitions during the mode-changing intervals subject to introducing undesired distortion in the decoded audio signal; means coupled to said control mechanism for developing a gating signal consisting of a series of pulses each of which corresponds to an assigned mode-changing interval and each of which embraces in point of time the undesired distortion occurring during its assigned mode-changing interval; and gating means coupled to said gating-signal-developing means and to said decoding device for utilizing said gating signal to effectively delete those portions of said decoded audio signal occurring during the mode-changing intervals, thereby removing said undesired distortion.

References Cited in the file of this patent

UNITED STATES PATENTS 2,656,411 Morris et al. ------------ Oct. 20, 1953